United States Patent [19]

Kubo et al.

[11] 3,738,182

[45] June 12, 1973

[54] CONTROL SYSTEM FOR AN AUTOMATIC TRANSMISSION

[75] Inventors: Seitoku Kubo; Mashanao Hashimoto; Teruo Akashi; Chihiro Hayashi, all of Toyota, Japan

[73] Assignee: Toyota Jidasha Kogyo Kabushiki Kaisha, Toyota-shi, Japan

[22] Filed: July 19, 1971

[21] Appl. No.: 163,838

[30] Foreign Application Priority Data

Nov. 21, 1970 Japan.............................. 45/103094

[52] U.S. Cl................................. 74/866, 74/752 A
[51] Int. Cl........................ B60k 21/00, F16h 3/74
[58] Field of Search............................... 74/753, 866

[56] References Cited
UNITED STATES PATENTS

| 3,590,663 | 7/1971 | Yamaguchi et al.................. | 74/867 |
| 3,543,611 | 12/1970 | Uozumi et al. ...................... | 74/867 |
| 3,561,296 | 2/1971 | Iijima.................................... | 74/869 |
| 3,651,714 | 3/1972 | Ohya et al. ........................... | 74/867 |

*Primary Examiner*—Arthur T. McKeon
*Attorney*—Cushman, Darby & Cushman

[57] ABSTRACT

In a vehicle automatic transmission wherein shift points are set through electrical controls, a control system for relieving a shock which occurs when the transmission shift lever is shifted from the neutral N position to the reverse R position or from the parking P position to the R position.

5 Claims, 10 Drawing Figures

3,738,182

INVENTORS
Seitoku KUBO
Mashanao HASHIMOTO
Teruo AKASHI
Chihiro HAYASHI

BY
ATTORNEYS

CONTROL SYSTEM FOR AN AUTOMATIC TRANSMISSION

BACKGROUND OF THE INVENTION

1. Field of the Invention

The present invention relates to a control system for automatic transmissions, particularly an automatic transmission which combines electrical and hydraulic controls.

2. Description of the Prior Art

With the conventional hydraulic automatic transmission or electrical automatic transmission, when the shift lever is moved from the N position to the R position or from the P position to the R position, hydraulic pressures are supplied to the rear clutch and rear brake band units (these units will be explained in detail later) which engage the reverse gear in the transmission. In this case, however, the values of the hydraulic pressures are the same with or higher than those of the hydraulic pressures used when the shift lever is moved to other positions and thus these units are rapidly operated with the result that an especially large shock is produced upon engagement of the reverse gear giving an uncomfortable feeling to the driver or passengers because of a generally large reverse gear ratio and the presence of the backlash in the power transmission system including the propeller shaft, differential gear and so on.

The main object of the present invention is to prevent shocks which occur when the gears are changed in a vehicle automatic transmission in which shift points are established through electrical controls. More particularly, the present invention has for its object the relieving of a shock which occurs when the transmission shift lever is moved from the N position to the R position or from the P position to the R position.

Therefore, the present invention contemplates, as a measure to relieve the shock, reduction of the rate of increase of the hydraulic pressure supplied to the rear clutch and rear brake band units for a predetermined time during the N-R or P-R shift, thereby effecting slower required gear changing engagements lessening the shock. Contrary to the conventional hydraulic control systems, the control system of the present invention does not require any addition of special valves and associated hydraulic circuits for shock controlling purposes and the intended objects of the present invention can be attained with the addition of a relatively simple electric circuitry alone and moreover its operations are really reliable. Thus, the control system of the present invention is a great improvement with respect to those problems, such as the instable shock relieving effect and the lack of durability of the friction elements of the engagement units due to the complicated hydraulic circuits and the resultant instability in the hydraulic pressures, which have hitherto been the case with the conventional hydraulic control systems.

DESCRIPTION OF THE PREFERRED EMBODIMENT

An embodiment of the present invention will now be explained in detail with the accompanying drawings.

Figure 1:
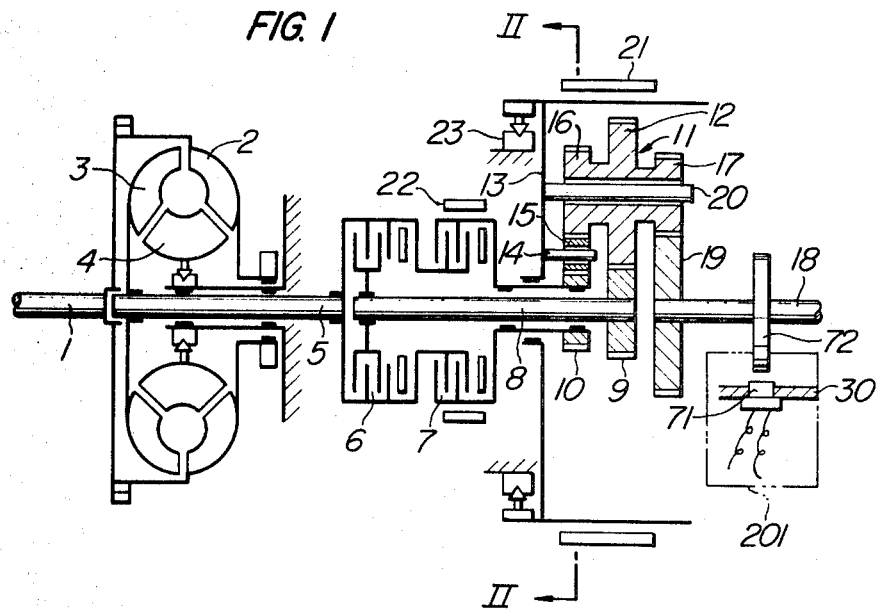
FIG. 1 is a schematic diagram for explaining the principle of the present invention, showing by way of example a transmission incorporating the present invention.
Figure 2:
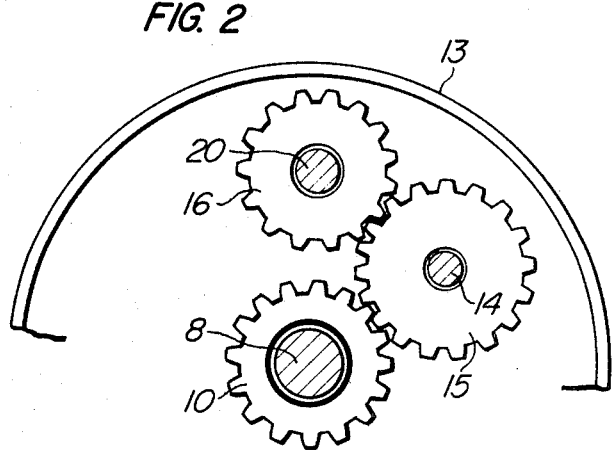
FIG. 2 is a fragmental sectional view taken along the line II—II of FIG. 1, showing in detail the idler gear and its associated gears which are not shown in FIG. 1.

FIGS. 1 and 2 illustrate a torque converter automatic transmission having three forward speeds and one reverse and controlled by the control system of the present invention. The transmission comprises a torque converter, a planetary gear unit, a hydraulic control unit and an electrical control unit. The torque converter is of the well-known type comprising a pump turbine 2, a turbine wheel 3 and a stator 4 with the pump turbine 2 being connected to an engine crank shaft 1 and the turbine wheel 3 being connected to a turbine shaft 5 to transmit the torque to the planetary gear unit. The planetary gear unit comprises two multi-plate clutches 6 and 7 which are engaged by hydraulic servomotors, two hydraulic brake band members 21 and 22, a one-way brake 23 using sprags, a planetary gear train including two sun gears 9 and 10 and two or three sets of pinion gears 11. The turbine shaft 5 is connected by means of the front clutch 6 to an intermediate shaft 8 carrying the input sun gear 9 and the shaft 5 is also connected to the reverse sun gear 10 by means of the rear clutch 7. The brake band member 22 (hereinafter referred to as a front brake band) is disposed around the outer periphery of the rear clutch 7 to brake the reverse sun gear 10 and the brake band 22 is applied by the hydraulic servo. The input sun gear 9 is in mesh with a gear 12 of a suitable number (two or three sets) of pinion gears 11 disposed around the outer periphery of the input sun gear 9. The reverse sun gear 10 is in mesh with an idler gear 15 carried on a carrier 13 and the idler gear 15 is in turn meshed with a gear 16 of the pinion gears 11. The rearmost gear 17 of the pinion gears 11 is engaged with a gear 19 carried on an output shaft 18 of the transmission. The pinion gears 11 and the idler gear 15 are carried on the carrier 13 by pinion pins 20 and 14 and the carrier 13 is provided with the brake band member 21 (hereinafter referred to as a rear brake band) which is applied by a hydraulic servo. The carrier 13 is also provided with the one-way brake 23 which holds the carrier 13 from rotation in one direction.

Next, with the construction described above, the operating conditions of the transmission will be explained.

The first forward speed is obtained by applying the front clutch 6 and the rear brake band 21. (However, when the drive is carried from the engine side, the one-way brake 23 is also applied and thus the rear brake band 21 need not necessarily be applied, but then in this case no power from the output shaft 18 is transmitted.) The rotation of the turbine shaft 5 is transmitted to the input sun gear 9 so that the input rotation is transmitted to the gear 19 on the output shaft 18 from the input sun gear 9 through the gear 12 and the gear 17 at a reduced speed, since the carrier 13 is held stationary by the rear brake band 21 and hence the pinion pin 20 is also held stationary.

In the second speed, the front clutch 6 and the front brake band 22 are applied. The input rotation is received through the input sun gear 9 and the reverse sun gear 10 is locked by the front brake band 22 and it remains stationary. The rotation of the input sun gear 9 causes the carrier 13 to rotate in the same direction as the input sun gear 9 through the reaction force of the reverse sun gear 10 so as to rotate the gear 9 on the output shaft 18 at a reduced speed.

The third speed is obtained by engaging the front clutch 6 and the rear clutch 7. The input is received through both the sun gears 9 and 10 so that the planetary gear system rotates as a unit and thus the turbine shaft 5 and the output shaft 18 are driven at a 1 : 1 ratio.

In the reverse, the rear clutch 7 and the rear brake band 21 are brought into action. The carrier 13 and hence the pinion pins 14 and 20 are held stationary so that the input rotation from the turbine shaft 5 is transmitted to the gear 19 on the output shaft 18 by way of the reverse sun gear 10, idler gear 15 and gears 16 and 17, thereby reversing the rotation of the output shaft 18.

Figure 3:
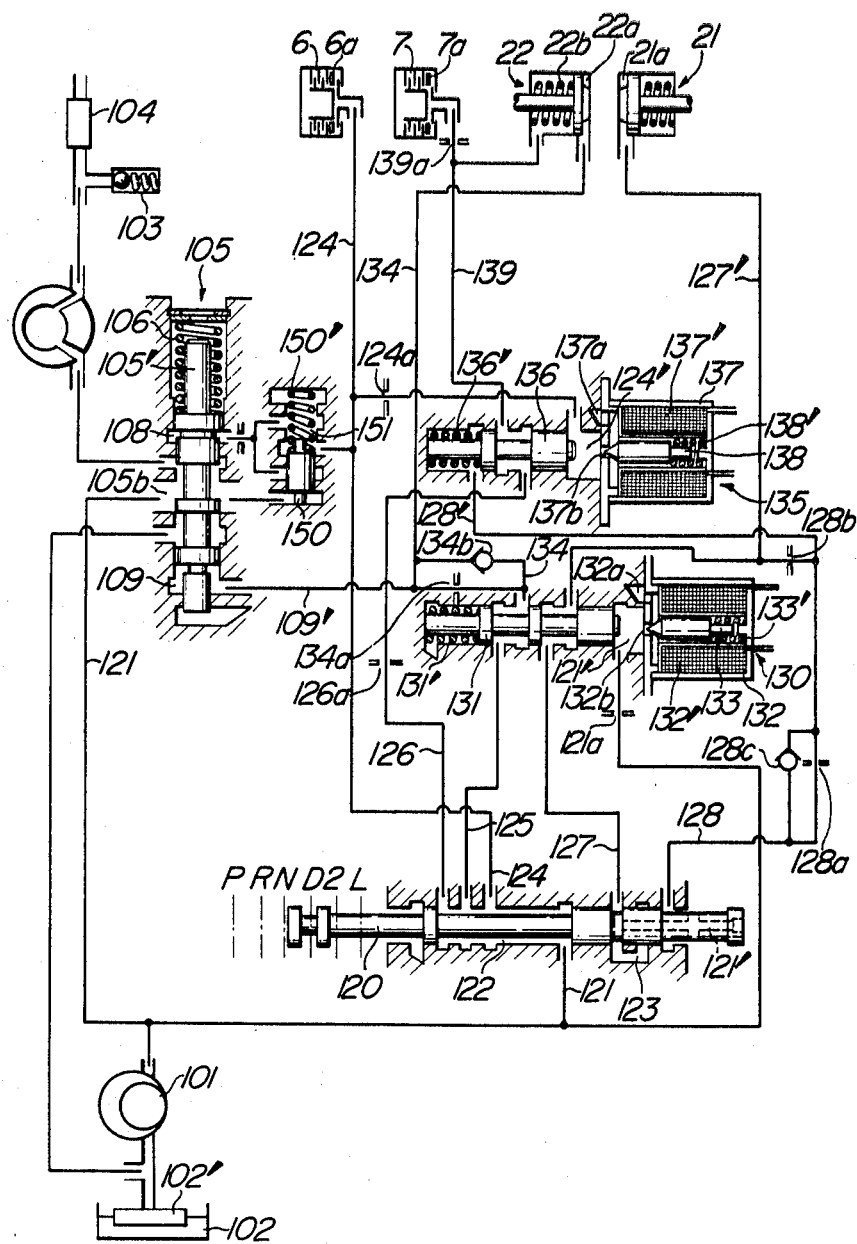
FIG. 3 and FIG. 4 are hydraulic circuit diagrams of the transmission with FIG. 3 showing the conditions in the D position—third speed and FIG. 4 showing the conditions in the R position.

Next, the hydraulic control section shown in FIGS. 3 and 4 will be explained. FIG. 3 illustrates a diagram showing the operating conditions when the transmission shift lever is in the D position, and the hydraulic pressures required for the hydraulic actuation circuit are supplied from a pump 101 employing gears, vanes or the like. The pump 101 is driven from a shaft directly connected to the engine so that the fluid is delivered from an oil reservoir 102 through an oil screen 102' into an oil passage 121. A pressure regulator valve 105 is of the type which is commonly used as a pressure regulator valve for automobile automatic transmissions and it comprises a spring 106 and a valve spool 105' so that the hydraulic pressures applied to oil chambers 108 and 109 having valve land differentials are balanced against the spring pressure of the spring 106 to effect the required pressure regulation. The hydraulic pressure thus regulated will be hereinafter referred to as a line pressure. The hydraulic pressure supplied to the oil chamber 108 is controlled by a relay valve 150 and the hydraulic pressure supplied to the oil chamber 109 is controlled by a 1-2 shift means 130. When no hydraulic pressure is supplied to an oil passage 124 from a manual valve 120, the relay valve 150 supplies to the oil chamber 108, a pressure reduced by the value corresponding to the spring pressure of a spring 150' to thereby increase the line pressure.

On the other hand, the oil chamber 109 is supplied with the hydraulic pressure through the oil passages 121, 125, 134 and 109' to chamber 109, which are connected when a shift valve 131 of the 1-2 shift means 130 is urged to the leftward position and in this way the line pressure is reduced. The hydraulic pressure regulated by the pressure regulator valve 105 is supplied to the manual valve 120. The manual valve 120 is linked to the transmission shift lever installed in the driver's seat and it has, as shown in FIG. 3, six positions: P, R, N, D, 2 and L. A portion of the manual valve 120 is formed with an internally extending hole so that the hydraulic pressure in the oil passage 121 is distributed into oil passages 127 and 128 through an oil passage 121' when it is in the R position.

With the manual valve in the N position, the oil passage 121 is shut off and valve chambers 122 and 123 are released. When the manual valve 120 is moved to the D position, the conditions shown in FIG. 3 are set up and the oil passage 121 connects with the oil passages 124, 125 and 126. The oil passage 124 is directly connected to a front clutch servo chamber 6a and the oil passage 125 is partly connected with a front brake band apply side servo chamber 22a and partly with the oil chamber 109 of the pressure regulator valve 105, respectively, through the 1-2 shift means 130. The oil passage 126 is connected with a gear clutch servo chamber 7a and a front brake band release side servo chamber 22b by way of a 2-3 shift means 135.

Figure 4:
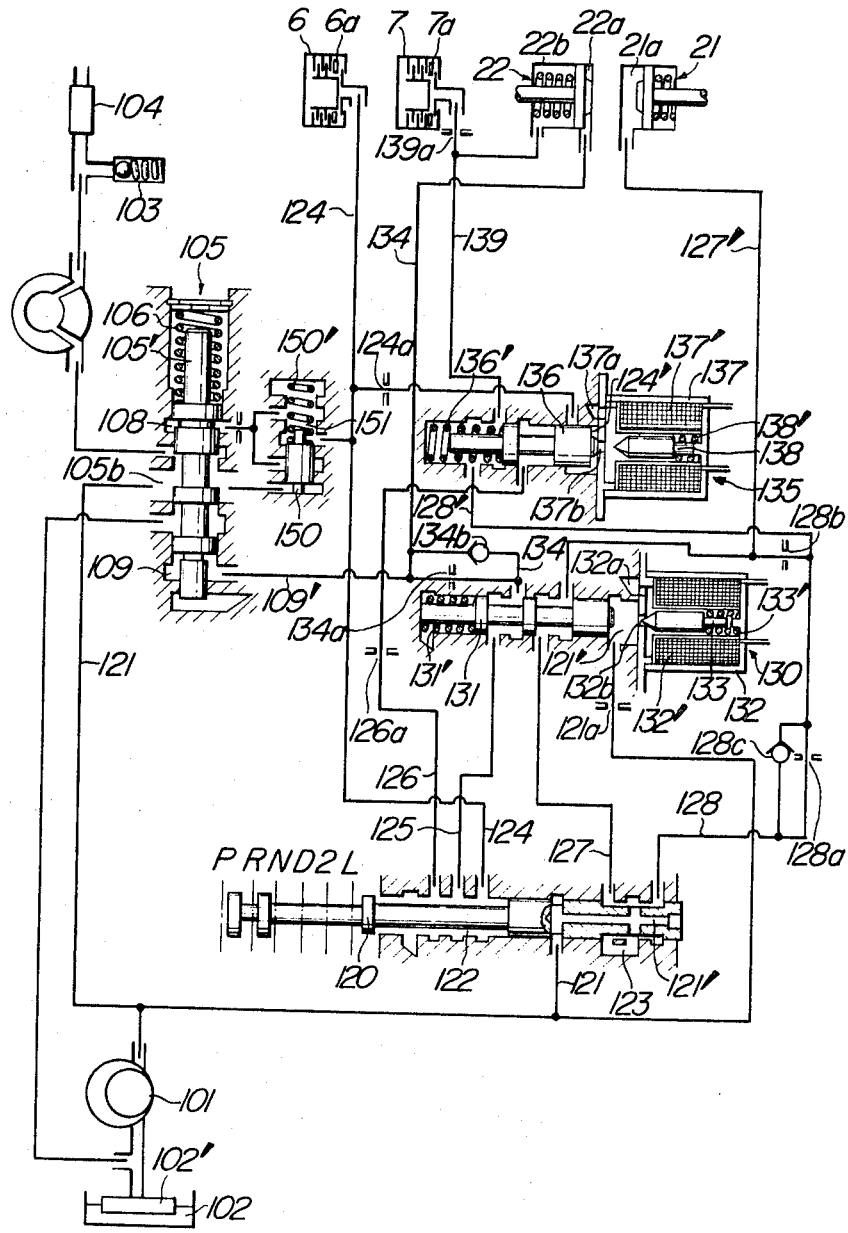

When the manual valve 120 is in the R position as shown in FIG. 4, the oil passages 124, 125 and 126 are exhausted and the oil passages 127 and 128 connect with the oil passage 121 through the oil passage 121' within the manual valve 120. The oil passage 127 is connected with a rear brake band apply side servo chamber 21a through the 1-2 shift means, while the oil passage 128 is connected with the rear clutch servo chamber 7a and with the front brake band release side servo chamber 22b through the 2-3 shift means. Oil passages 127' and 128' are connected with each other through an orifice 128b.

With the manual valve 120 in the P position, the oil passages are closed as will be the case when the manual valve is in the N position.

The 1-2 shift means 130 comprises the shift valve 131, a 1-2 solenoid 132, and a spring 131'. The 1-2 solenoid 132 comprises a plunger 133, a spring 133', a coil 132' and so on. Defined between the right end of the 1-2 shift valve 131 and the 1-2 solenoid 132 is a valve chamber 121' which is supplied with the hydraulic pressure from the oil passage 121 through an orifice 121a. The 1-2 solenoid 132 is controlled with signals from the electrical control section. When the 1-2 solenoid coil 132' is not energized, the plunger 133 is moved to its leftward position by the spring 133' so that a solenoid orifice 132b is shut off to close the valve chamber 121'. Thus, the hydraulic pressure in the valve chamber 121' causes the 1-2 shift valve 131 to move to its leftward position against the spring pressure of the spring 131'. When the 1-2 solenoid 132 is energized, the plunger 133 is moved to its rightward position by the electromagnetic force so that the hydraulic pressure in the valve chamber 121' is exhausted to an exhaust port 132a through the orifice 132b. In this case, the dimension of the orifice 121a is small enough as compared with the orifice 132b so that no residual pressure is produced in the valve chamber 121'. Thus, the 1-2 shift valve 131 is moved to its rightward position by the spring pressure of the spring 131'.

The 2-3 shift means 135 comprises a 2-3 shift valve 136, a spring 136' and a 2-3 solenoid 137. The 2-3 solenoid 137 comprises a coil 137', a spring 138', a plunger 138 and so on. A valve chamber 124' is defined between the 2-3 shift valve 136 and the 2-3 solenoid 137 and it is supplied with the hydraulic pressure from the oil passage 124 through an orifice 124a. When the 2-3 solenoid coil 137' is energized with a signal from the electrical control section, the 2-3 shift valve 136 is moved to its rightward position through the similar action as in the case of the 1-2 shift means. In this case, the dimension of the orifice 124a is made small enough as compared with the orifice 137b and thus no residual pressure is produced in the valve chamber 124'. When the coil 137' is not energized, the 2-3 shift valve 136 is moved to its leftward position by the action of the hydraulic pressure in the valve chamber 124'.

While the hydraulic servos in the transmission are brought into action according to the set positions of the above-mentioned manual valve 120, 1-2 shift 131 and the 2-3 shift valve 136 so as to determine the gear positions, the positions of the shift valves 131 and 136 are determined according to the presence (energized) or absence (de-energized) of a signal from the electrical control section. However, with the manual valve 120 in the 2 or L position, the oil passage 126 is exhausted so that no hydraulic pressure is supplied at all times to the rear clutch servo chamber 7a and the front brake band release side servo chamber 22b irrespective of whether the 2-3 solenoid 137 is energized. On the other hand, with the manual valve 120 in the R position, the oil passage 124 is exhausted and hence the hydraulic pressure in the valve chamber 124' is exhausted so that the 2-3 shift valve 136 is moved to its rightward position under the spring pressure of the spring 136' independent of the energization or de-energization of the 2-3 solenoid 137. Thus, since the oil passage 127' is connected with the oil passage 128 by way of the orifice 128b, the hydraulic pressure is supplied to the rear clutch servo chamber 7a, front brake band release side servo chamber 22b and rear brake band apply side servo chamber 21a independent of the set position of the 1-2 shift valve 131. The following table shows the summary of the energization and de-energization of the solenoids in the forward speeds and the selected gear positions:

way of an ignition switch 254 through a fuse 255 and operated in association with the transmission shift lever. The power supply unit 250 also supplies a constant voltage to the various component elements of the computer circuit 200 via a line 252' from a power supply) constant voltage power supply) 252.

The computer circuit 200 comprises a vehicle speed detector 201, a waveshaping and amplifying circuit 202, a D-A converting circuit 203, a D and 2 position 1-2 shift discrimination circuit 204 (hereinafter referred to as a D position 1-2 shift discrimination circuit), a hysteresis circuit 205, an L position 1-2 shift discrimination circuit), a hysteresis circuit 205, an L position 1-2 shift discrimination circuit 206, a hysteresis circuit 207, a gating circuit 212, an amplifier circuit 213, a 1-2 solenoid 132, a 2-3 shift discrimination circuit 208, a hysteresis circuit 209, an amplifier circuit 214, a 2-3 solenoid 137, a throttle position switch 210, and a throttle position voltage generator 211. The operations of these circuit elements will now be explained.

As schematically shown in FIG. 1, the vehicle speed detector 201 comprises a toothed disk 72 of a magnetic material securely mounted on the transmission output shaft 18 and a sensor 71 comprising a permanent magnet housed in a casing of a non-magnetic material securely mounted on a transmission housing 30 and a coil wound on the permanent magnet. The detector 201 generates a sinusoidal wave signal having a frequency proportional to the revolutions of the transmission output shaft 18 (i.e. the vehicle speed). Having been changed into a rectangular wave signal and amplified in the wave-shaping and amplifying circuit 202, the signal is converted in the D-A converting circuit 203 into a positive DC voltage signal proportional to the vehicle speed. This DC voltage signal (vehicle speed signal $E_n$) is then supplied to the D position 1-2 shift discrimination circuit 204, L position 1-2 shift discrimination circuit 206 and 2-3 shift discrimination circuit 208 through lines 203', 204'' and 203''', respectively.

| | Manual valve position | | | | | | |
|---|---|---|---|---|---|---|---|
| | D | | | 2 | | L | |
| Gear position | 1st speed | 2d speed | 3d speed | 1st speed | 2d speed | 1st speed | 2d speed |
| 1-2 solenoid | Energized | Deenergized | Deenergized | Energized | Deenergized | Deenergized | Energized |
| 2-3 solenoid | do | do | Energized | do | | | |

As shown in the table, in the L position of the manual valve 120 the energization and de-energization of the 1-2 solenoid for engaging the first and the second speed gears are contrary to those which are required for engaging the first and second speed gears in the D and 2 positions. Thus, even if both the 1-2 and 2-3 solenoids are not energized due to the failure of the electrical control section, for example, the L position—first speed, the 2 position—second speed and the D position—third speed gears may be obtained, thereby enabling, so-called, manual driving.

Figure 5:
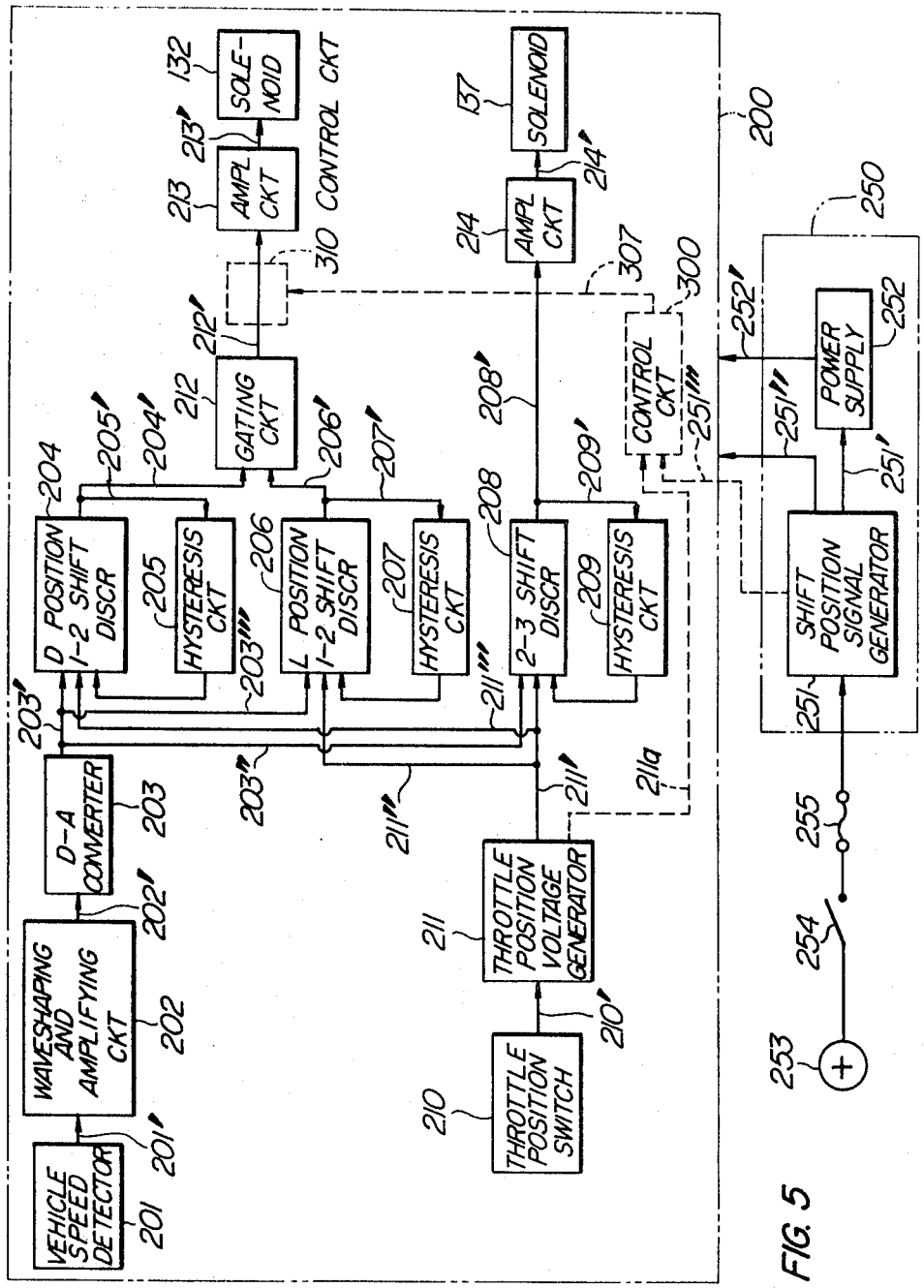
FIG. 5 is a block diagram of an electrical circuit for controlling the shift signals required for the transmission.

Next, a signal generating means for energizing the 1-2 and 2-3 solenoids will be explained with reference to FIG. 5. The signal generating means mainly comprises a power supply unit 250 and a computer circuit 200 including vehicle speed and engine load detectors, 1-2 and 2-3 shift solenoid driving circuits and so on.

Figure 6:
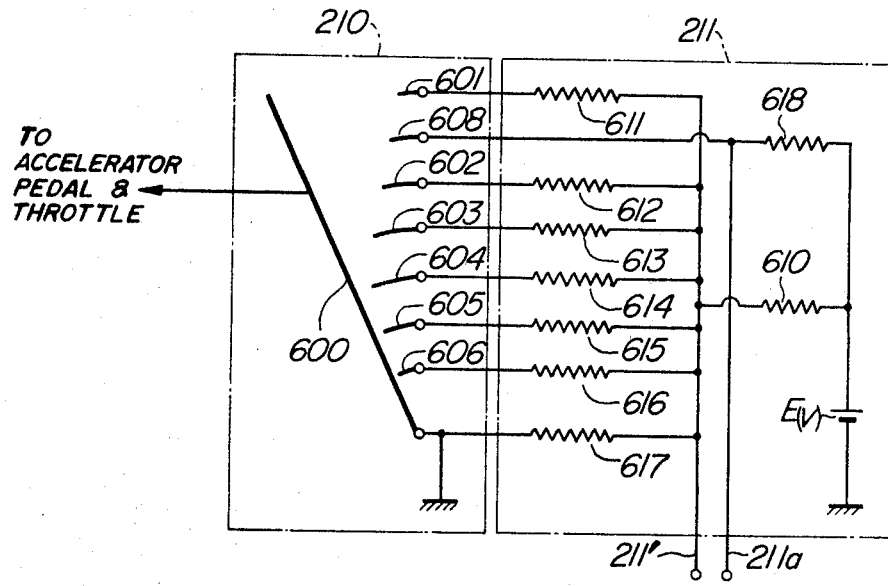
FIG. 6 is a circuit diagram of a throttle position voltage generator.

The power supply unit 250 supplies P, R, N, D, 2 and L position signals to the computer circuit 200 via a line 251'' from a shift position signal generator 251 comprising a shift position switch and a switching circuit connected to a positive terminal 253 of the battery by The throttle position switch 210 comprises, as shown in FIG. 6, a movable contact 600 and fixed contacts 601, 602, 603, 604, 605 and 606 and it is constructed such that the movable contact 600 successively disengages the fixed contacts 601, 602, 603, 604, 605 and 606 in accordance with the throttle openings. (FIG. 6 shows the condition corresponding to the wide open throttle position.) The throttle position signal generator 211 comprises, as also shown in FIG. 6, a constant voltage source $E_v$ and resistors 611, 612, 613, 614, 615 and 616 connected to the constant voltage source $E_v$ through a resistor 610, and the resistors 611 through 616 are connected to the fixed-contacts 601 through 606, respectively. Thus, by properly setting the resistance values of these resistors, a DC voltage (throttle position signal $E_\theta$) is produced which varies in a step fashion according to the throttle openings and the voltage is then supplied to the three shift discrimination circuits 204, 206 and 208 through a line 211'. A fixed contact 608 of the throttle position switch 210 and a resistor 618 of the throttle position voltage generator 211 are provided for generating a signal representative of a small throttle opening in addition to the throttle position signal $E\theta$, so that a zero voltage signal (0 signal) is produced and delivered over a line 211a when the throttle opening is less than a predetermined throttle opening (for example, 0.5/4 throttle), while a voltage signal (1 signal) is delivered when the throttle opening is larger than the predetermined throttle opening.

The D position 1-2 shift discrimination circuit 204, L position 1-2 shift discrimination circuit 206 and 2-3 shift discrimination circuit 208 are similar in construction and comprise a conventional differential comparator circuit which compares the vehicle speed signal $E_n$ and the throttle position signal $E\theta$ for their relative magnitudes so as to produce either a 0 signal (no voltage) or a 1 signal (voltage present) according to the result of the comparison. In other words, the vehicle speed signal $E_n$ and the throttle position signal $E\theta$ are introduced at the inputs of the differential comparator circuit discussed in detail in the patent to Ito et al. U.S. Pat. No. 3,650,151 through suitable voltage dividing resistors and the voltage dividing ratios of these resistors are selected such that the D position 1-2 shift discrimination circuit 204 produces a 0 signal when $E_n \geq AE\theta$ and the 2-3 shift discrimination circuit 208 produces a 0 signal when $E_n \geq BE\theta$ ($B > A$).

The hysteresis circuits 205 and 209 see Ito et al. U.S. Pat. No. 3,650,151, referred to above and are adapted to vary the dividing ratios of the said voltage dividing resistors when the discriminator circuits 204 and 208 produce an 0 output signal, respectively, thereby preventing the hunting of the output signals produced by these discrimination circuits. In this manner, the output of the D position 1-2 shift discrimination circuit 204 changes to 1 when $E_n \leq A'E\theta$ ($A' < A$) and the range $A'E\theta < E_n < AE\theta$ constitutes a so-called hysteresis region wherein the preceding condition is retained. Similarly, the output of the 2-3 shift discrimination circuit 208 changes to 1 when $E_n \leq B'E\theta$ ($B' < B$) and the range $B'E\theta < E_n < BE\theta$ constitutes a hysteresis region. With the L position 1-2 shift discrimination circuit 206, the relation between the input signals $E_n$ and $E\theta$ is reversed so that it produces a 1 signal when $E_n \geq CE\theta$ and a 0 signal when $E_n \leq C'E\theta$ ($C' < C$), and in the similar manner the range $C'E\theta < E_n < CE\theta$ constitutes a hysteresis region. The reason for reversing the discrimination conditions (the relation between $E_n$ and $E\theta$) of the L position 1-2 shift discrimination circuit 206 resides in the fact that as previously explained in connection with the description of the hydraulic control section, the operations of the 1-2 solenoid 132 when the manual valve 120 is in the D or 2 position are in a reversed relation with its operations when the manual valve 120 is in the L position (See the foregoing table).

The gating circuit 212 see It et al. U.S. Pat. No. 3,650,151 is adapted to permit the output signal of the L position 1-2 shift discrimination circuit 206 to appear on a line 212' when the manual valve 120 is in the L position, while it permits the output signal of the D position 1-2 shift discrimination circuit 204 to appear on the line 212' when the manual valve 120 is in any of the remaining positions. The L position signal produced by the shift position signal generator 251 is utilized as a gating signal for the gating circuit 212.

The amplifier circuits 213 and 214 amplify the 1 signals of the discrimination circuits to a level sufficient to energize the 1-2 solenoid 132 and the 2-3 solenoid 137.

With the circuit construction described above, the signals required for energizing and de-energizing the solenoids as summerized in the foregoing table are obtained.

Next the principal feature of the present invention, that is, the control means for relieving the shocks during the N-R and P-R shifts will be explained. This shock relieving means produces a suitable timing signal in response to a signal produced when the shift lever is moved from the N to R position or from the P to R position and the small throttle opening signal, so that the 1-2 solenoid 132 is energized for an appropriate time with the signal so as to temporarily reduce the hydraulic pressure during the engagement of the rear clutch 7 and the rear brake band 21 adapted to provide the reverse, thereby relieving the shock. As shown in FIG. 5 with broken lines, the shock relieving means comprises a first control circuit 300 and a second control circuit 310 (OR circuit).

Figure 7:
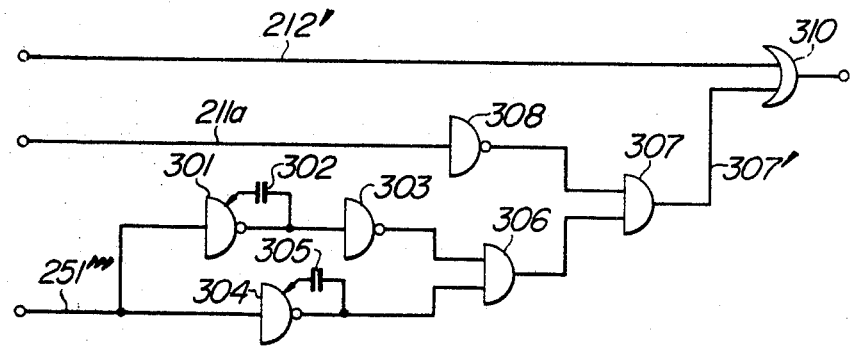
FIG. 7 is a block diagram of an electrical circuit according to the present invention for controlling the shocks.
Figure 8:
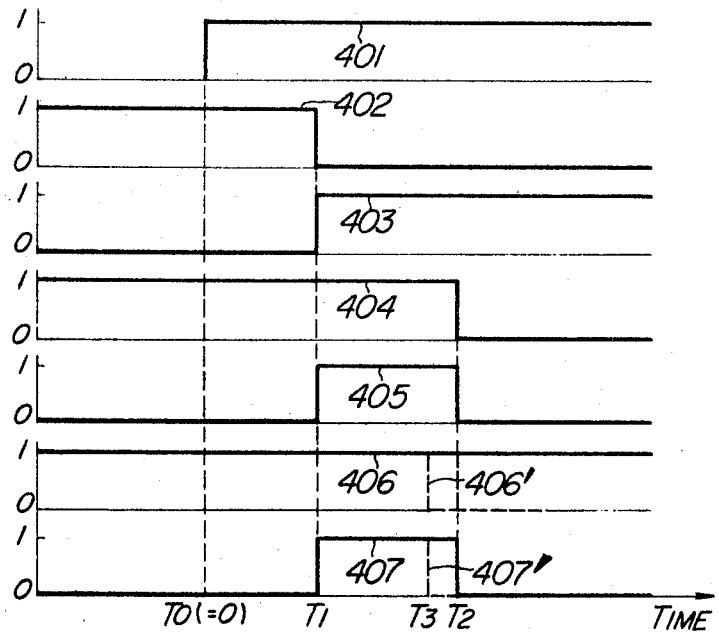
FIG. 8 is a diagram showing the output signal waveforms of the shock control circuit.

As shown in FIG. 7, the control circuits comprise a delay circuit 301 including a capacitor 302 having a time constant $T_1$, inverter circuits (0 and 1 signal inverting circuits) 303 and 308, a delay circuit 304 including a capacitor 305 having a time constant $T_2$, AND circuits 306 and 307, and the OR circuit 310. The operations of these circuit elements will now be explained with reference to the output signal waveform diagram illustrated in FIG. 8. Assuming that an N to R shift or P to R shift is effected at a time $T_o$ ($= 0$), the shift position signal generator 251 produces a signal as shown by a waveform 401. This signal is branched so that one is supplied to the delay circuit 301 where it is converted into signal 402 which falls at a time later than $T_o$ by $T_1$ an it is then inverted in the inverter circuit 302 into a signal shown by a waveform 403, while the other of the signal is converted in the delay circuit 304 into a signal shown by a waveform 404 which changes to 0 at a time which is still later by a time $T_2$. In this case, if the condition $T_1 < T_2$ is preselected, the two signals 403 and 404 may be converted by the AND circuit 306 into a rectangular signal designated by a waveform 45 which rises after a time $I_1$ from the time $T_o$ and whose time width is $T_2 - T_1$. This signal is supplied to the second AND circuit 307. The other input signal of the second AND circuit 307 is a signal 406 obtained by the inverting in the inverter circuit 308 a signal delivered from the output line 211a of the throttle position signal generator 211 and corresponding to a predetermined throttle opening. Thus, when the signal 406 is 1 as shown in FIG. 8, that is, when the throttle opening is less than the predetermined throttle opening (for example, 0.5/4 throttle), the signal 405 produced from the AND circuit 307. A signal 406' indicated by a broken line represents the condition that the throttle opening at a time $T_3$ ($T_3 < T_2$) is larger than the predetermined throttle opening and in this case the output signal of the AND circuit 307 extinguishes at the time $T_3$ show by a broken line 407'.

Figure 9:
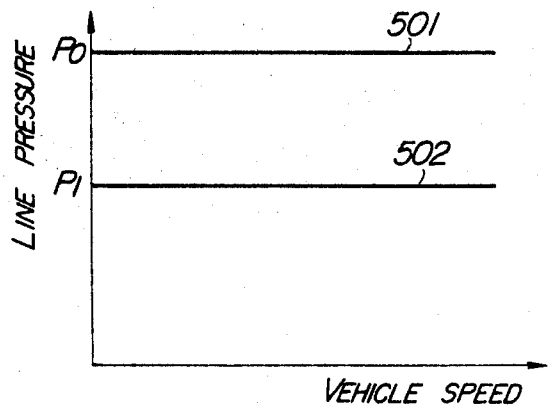
FIG. 9 is a diagram showing the line pressures in the R position.

The output of the AND circuit 307 energizes the 1-2 solenoid 132 by way of the OR circuit 310 and the amplifier circuit 213. When the 1-2 solenoid 132 is energized, as previously explained in connection with the description of the hydraulic circuit in the reverse shown in FIG. 4, the hydraulic pressure in the valve chamber 121' is exhausted through the exhaust port 132a of the 1-2 shift means 130 and the 1-2 shift valve 131 is moved to the rightward position so that the oil passage 127 is disconnected from the oil passage 127' and the oil passage 127 is connected with the oil passage 134. Thus, the oil under pressure is supplied to the oil chamber 109 of the pressure regulator valve 105 through the oil passage 109', thereby reducing the line pressure. In this case, the oil passage 128 is connected with the oil passage 127' through the orifices 128a and 128b so that even if the oil passages 127 and 127' are disconnected, the pressurized oil is supplied to the rear brake band servo chamber 21a and moreover the action of the orifices 128a and 128b which controls the rising characteristic of the oil pressure ensures a smooth rising of the supplied oil pressure and hence the reduced shock. FIG. 9 shows the line pressures obtained when the manual valve 120 is in the R position, and the line pressures as designated by lines 502 and 501 are obtained corresponding to the energization and de-energization of the 1-2 solenoid 132.

Figure 10:
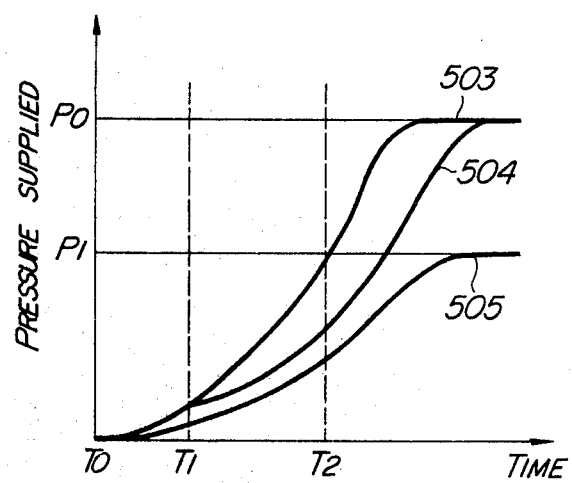
FIG. 10 is a diagram showing the rising characteristics of the hydraulic pressure supplied to the rear clutch and the rear brake band.

FIG. 10 illustrates the rising characteristic of the oil pressure supplied to the rear clutch and the hydraulic servo chamber of the rear brake band with a curve 503 indicating the characteristic when the 1-2 solenoid 132 is continuously de-energized, a curve 505 indicating the characteristic when the solenoid 132 is continuously energized and curve 504 indicating the characteristic when the solenoid 132 is energized during the interval between the times $T_1$ and $T_2$. As will be apparent from this diagram, the hydraulic pressure rises with a moderate curve during the time interval between $T_1$ and $T_2$. Thus, by selecting the times $T_1$ and $T_2$ such that the rear clutch and the rear brake band are applied between the times $T_1$ and $T_2$, a smooth gear shift with a reduced shock can be ensured.

While a specific embodiment of the present invention wherein the small throttle opening signal constitutes the essential requirement for the line pressure has been described, it should be noted that the small throttle opening as employed in the illustrated embodiment means a low engine load condition and thus the signal may be replaced with any other engine load responsive signal (for example, a signal responsive to the intake manifold vacuum, the slip factor between the pump and the turbine of a torque converter or the like). Furthermore, since the line pressure control is effected only under the low engine load condition because of the fear that problems such as the burning of the friction elements due to the considerably increased slip in the rear clutch and the rear brake band may result if the line pressure controls is effected under high engine load conditions, the low engine load condition need not be the essential requirement for the line pressure control if there is no possibility of such problems. Still furthermore, other modifications may easily be carried out; for example, the times $T_1$ and $T_2$ may be chosen so as to be suitable for the engine load.

While the preferred embodiment of the present invention has been described as applied to an automatic transmission having three forward speeds and one reverse, it is apparent that the present invention may be embodied in many other forms without departing from the scope and the spirit of the invention as claimed in the accompanying claims.

We claim:

1. A vehicle automatic transmission comprising a speed change gear, and frictionally engageable means with hydraulic servos for accomplishing the required gear changing operations of the speed change gear, an automatic transmission control system comprising:

a hydraulic control system for controlling a supply of fluid under hydraulic pressure to said frictionally engageable means;

a vehicle driving condition responsive electrical signal generating means;

shift control means responsive to said vehicle driving condition responsive electric signal to generate an electrical signal for actuating said hydraulic control system;

shift position signal generating means for detecting shift gear positions, and shock control signal generating means for generating an electrical signal having predetermined duration including a logic means for combining the electric signal generated by said shift position signal generating means when operated upon establishment of the reverse gear position, and the electric signal corresponding to a predetermined condition of said vehicle driving condition responsive electric signal generating means, the electric signal generated by said shock control signal generating means actuating said hydraulic control system to control the supply of liquid under hydraulic pressure to said frictionally engageable means for shifting the automatic transmission to the reverse gear position, thereby reducing gear shifting shock.

2. The control system according to claim 1, wherein said vehicle driving condition responsive electrical signal generating means comprises:

low engine load signal generating means, and said shock control signal generating means responds to a low engine load signal from said low engine load signal generating means to produce an electrical signal for said predetermined duration only when the reverse gear position is established under a low engine load, said shock control signal generating means terminating said electric signal at an instant when an engine load reaches a predetermined magnitude within said predetermined duration.

3. A control system according to claim 1, wherein said hydraulic pressure supply control means comprises a shift control valve for supplying a hydraulic pressure to the hydraulic servo means for changing the transmission to the reverse gear, a pressure regulator valve for regulating the valve of said hydraulic pressure, pressure lines for connecting said hydraulic servo means with said shift control valve, orifices for controlling the flow rate of the hydraulic pressure supplied to said hydraulic servo means, and a pressure line inter-connecting said pressure regulator valve and said shift control valve for supplying a hydraulic pressure into an oil chamber of said pressure regulator valve to reduce the hydraulic pressure regulated by said pressure regulator valve, whereby in response to the electrical signal generated by said shock control signal generating means said shift control valve is actuated upon shifting into the reverse gear so that the rising characteristic of the hydraulic pressure supplied to said hydraulic servo means for engaging said reverse gear is modified by virtue of a reduction in the regulated hydraulic pressure and the flow rate control effected by said orifices, thereby lessening the shock during the gear changing operation.

4. The control system according to claim 1 wherein said logic means includes:
- a first delay circuit producing an output at a selected time after an input from the shift position signal generating
- a second delay circuit producing an output at a different selected time after receipt of the electric signal indicative of the predetermined driving condition;
- said delay circuits producing the signal of the shock control circuit for a selected duration for actuating said hydraulic control system.

5. The vehicle automatic transmission system of claim 3 wherein each of said delay means includes a gate circuit for producing an output in response to its selected input and energy storage means including a capacitor for delaying the output of each of said gates a selected amount in accordance with its energy storage characteristic; and
- AND gate means for combining the two delayed signals during their simultaneous occurrence to produce a square wave signal corresponding to said shock control circuit electrical signal.

* * * * *